C. S. JOHNSTON, R. C. JEFFERIES & W. J. RYAN.
DEEP TILLING ATTACHMENT FOR PLOWS.
APPLICATION FILED JAN. 22, 1912.
1,061,479. Patented May 13, 1913.
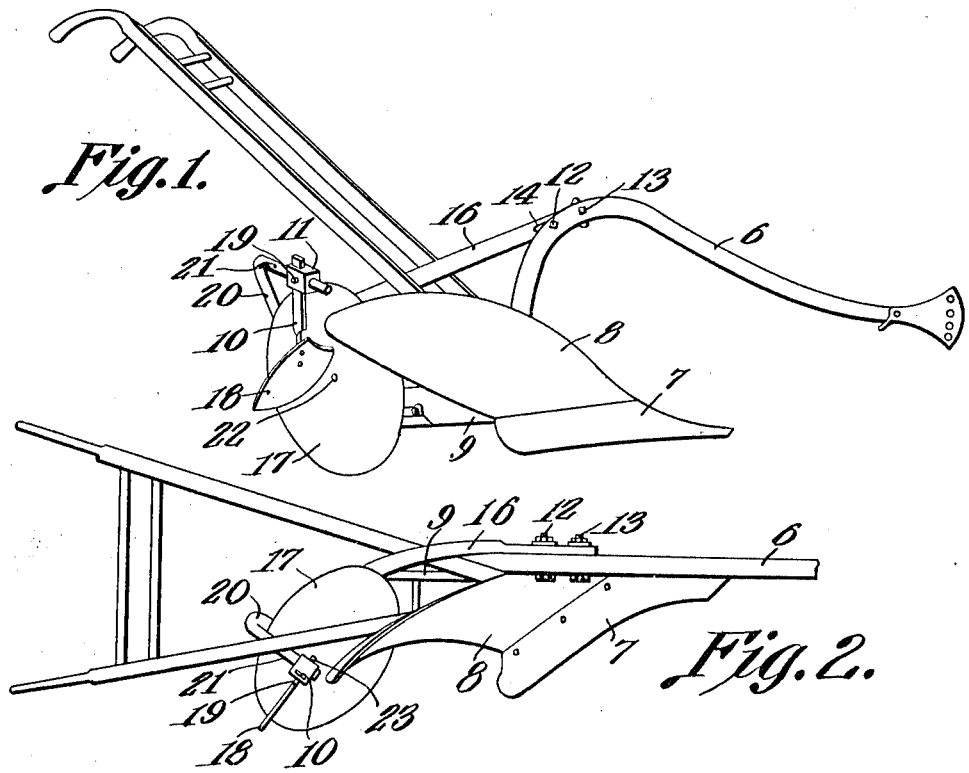
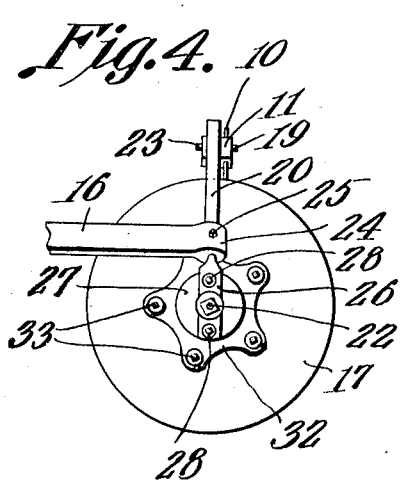
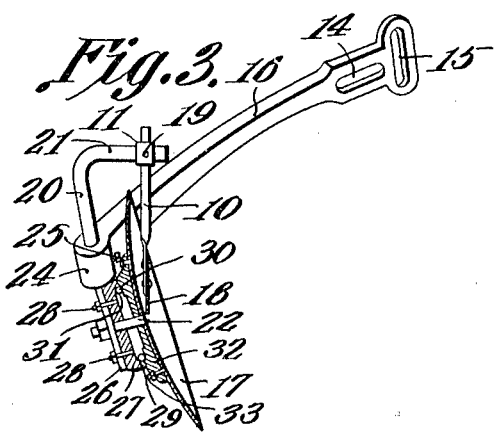
Witnesses
C. S. Johnston,
Roy C. Jefferies and
W. J. Ryan, Inventors
by C. A. Snow & Co.
Attorneys

UNITED STATES PATENT OFFICE.

CLARENCE S. JOHNSTON, ROY C. JEFFERIES, AND WILLIAM J. RYAN, OF GLENDIVE, MONTANA.

DEEP-TILLING ATTACHMENT FOR PLOWS.

1,061,479. Specification of Letters Patent. Patented May 13, 1913.

Application filed January 22, 1912. Serial No. 672,776.

*To all whom it may concern:*

Be it known that we, CLARENCE S. JOHNSTON, ROY C. JEFFERIES, and WILLIAM J. RYAN, citizens of the United States, residing at Glendive, in the county of Dawson, State of Montana, have invented a new and useful Deep-Tilling Attachment for Plows, of which the following is a specification.

This invention relates to plows, and is particularly a deep tilling attachment for plows, having for its primary object to provide a trailing and auxiliary tiller to pulverize the subsoil of the furrow made by the plow and deposit same upon the soil turned by the plow, to cover the turned soil with a dust mulch and thereby also forming a seed bed over the turned or tilled soil broken or stirred by the plow.

The invention has for a further object to provide an attachment of this character which is comparatively simple and inexpensive in construction, and effective and convenient in use, the same being readily applicable to various plows, such as lister plows, stirring plows, sub soilers, breaking plows, sulky or engine gang plows.

With the above and other objects in view, this invention is embodied in the novel construction and combination of parts as hereinafter elicited, reference being had to the accompanying drawings, wherein similar reference characters indicate similar parts, and wherein:

Figure 1 is a perspective view of a plow embodying the present invention. Fig. 2 is a plan view thereof, parts broken away. Fig. 3 is a perspective view of the attachment, parts being shown in section. Fig. 4 is a fragmental perspective of the attachment.

Referring in detail to the drawings, the plow embodies the usual plow beam 6, share 7, landside bar 9, and a mold board 8. The plow as shown in the drawings is of the ordinary plow construction and need not be described in detail. The attachment comprises in its essentials, a curved beam 16, a standard 20 vertically and rotatably adjustable in the rear end of the beam, a rotary disk mold board 17 carried by the lower end of the standard 20, and a deflector 18 coöperating with the disk mold board 17. The beam 16 at its forward end has an elongated vertical slot 15 and a horizontal elongated slot 14 adjacent or next inside the slot 15, and at the rear end the beam 16 is provided with an upright eye 24 through which the circular standard 20 passes. The standard 20 is rotatable and slidable in the eye 24 and is held at any adjustment by means of set screws 25 engaging through the eye 24 to contact with the standard. The lower end of the standard 20 is flattened as designated by the numeral 26 and has secured thereto a bearing or block 27 by means of the bolts 28, which bearing is provided with an annular ball race 29. A dished or concaved disk mold board 17 is mounted upon the lower end of the standard 20 by means of a bolt 22, the disk mold board having a bearing or block 32 secured to the rear face thereof by bolts 33 and having an annular ball race 30 coinciding with the ball race 29, of the bearing 27. A series of ball bearings 31 are disposed between the ball races 29 and 30 to form anti-frictional means for rotatably mounting the disk mold board 17 upon the lower end of the standard 20, the said ball bearings receiving the thrust to which the disk mold board is subjected. The standard 20 has the upper angular extremity 21 extending over the disk mold board 17, and a block 11 is slidable upon the said angular extremity, said block being secured in any adjustment by means of a set screw 23. A standard 10 is vertically adjustable in the block 11 and is retained at any adjustment by means of a set screw 19 carried by the said block. A deflector 18 is secured to the lower end of the standard 10.

The beam 16 of the attachment is secured to the beam 6 of the plow by means of bolts 12 and 13 which are passed through the respective slots 14 and 15 of the beam 16, thereby permitting the beam 16 to be swung vertically to give the disk mold board 17 its initial adjustment. The beam 16 being curved and skewed or twisted permits the disk mold board to stand in advance of the rear end of the said beam, and the said beam being adjustably connected to the vertical side of the plow beam permits the standard of the mold board to be swung vertically, which in connection with the rotary adjustment of the standard will permit the disk mold board to be so adjusted to trail in a canted position in rear of the plow proper. Set screws 25 permit the standard to be adjusted vertically to properly position the disk mold board 17 in accordance with the requirements to bring the disk mold board 17 below the plow proper and in such a position that it will properly perform its functions. The deflector 18 is properly positioned with respect to the disk mold board 17 by adjusting the block 11 upon the angular extremity 21 of the standard 20 and by adjusting the standard 10 in the block 11, as will be clearly understood.

In use, as the plow is drawn forward to turn or break the soil, the disk mold board 17 trails in rear of the plow proper at a depth below the bottom of the furrow formed by the plow, and in so doing pulverizes the sub-soil at the bottom of the furrow and together with the deflector 18 deposits the pulverized sub-soil upon the soil turned by the plow, thereby covering the turned soil with a pulverized or dust mulch. The depth of this pulverized or dust mulch is determined by the depth to which the disk mold board is adjusted and according to the angle at which the disk mold board is set, this being determined according to the various circumstances and characters of soil. A covering of pulverized or dust mulch of this character is highly valuable in arid localities to retain the moisture in the soil, and the same also forms a seed bed.

As above indicated, this invention is applicable to various forms of plows, it being primarily adapted to trail behind the plow proper at a depth varying in practice from four to eight inches below that of the plow proper.

In the above manner, the objects aimed at are attained in an efficient manner, and it is also understood that this invention is susceptible of alteration in its details within the scope of the appended claims without departing from the spirit of the invention.

Having described the invention, what is claimed as new is:

1. The combination with a plow embodying a beam, of a trailing attachment embodying a curved beam having a transverse and a longitudinal slot at its forward end, bolts carried by the former beam and passing through the said slots, a standard vertically and rotatably adjustable in the rear end of the latter beam in rear of the plow, a rotary disk mold board carried by the lower end of the standard to trail in rear of the plow, and a deflector adjustably connected to the upper end of the standard and coöperating with the disk mold board so as to pulverize and deposit the sub-soil of the furrow made by the plow upon the soil turned thereby.

2. The combination with a plow embodying a beam, of a trailing attachment embodying a curved and skewed beam having its forward end adjustably secured to the vertical side of the said beam and having an eye at its rear end, a standard adjustable through the said eye so as to lie in a canted position, and a rotary disk mold board carried by the lower end of the standard to trail in rear of the plow, so as to pulverize and deposit the sub-soil of the furrow made by the plow upon the soil turned thereby.

In testimony that we claim the foregoing as our own, we have hereto affixed our signatures in the presence of two witnesses.

CLARENCE S. JOHNSTON.
ROY C. JEFFERIES.
WILLIAM J. RYAN

Witnesses:
J. M. O'NEIL,
M. J. HUGHES.

---

Copies of this patent may be obtained for five cents each, by addressing the "Commissioner of Patents, Washington, D. C."